UNITED STATES PATENT OFFICE.

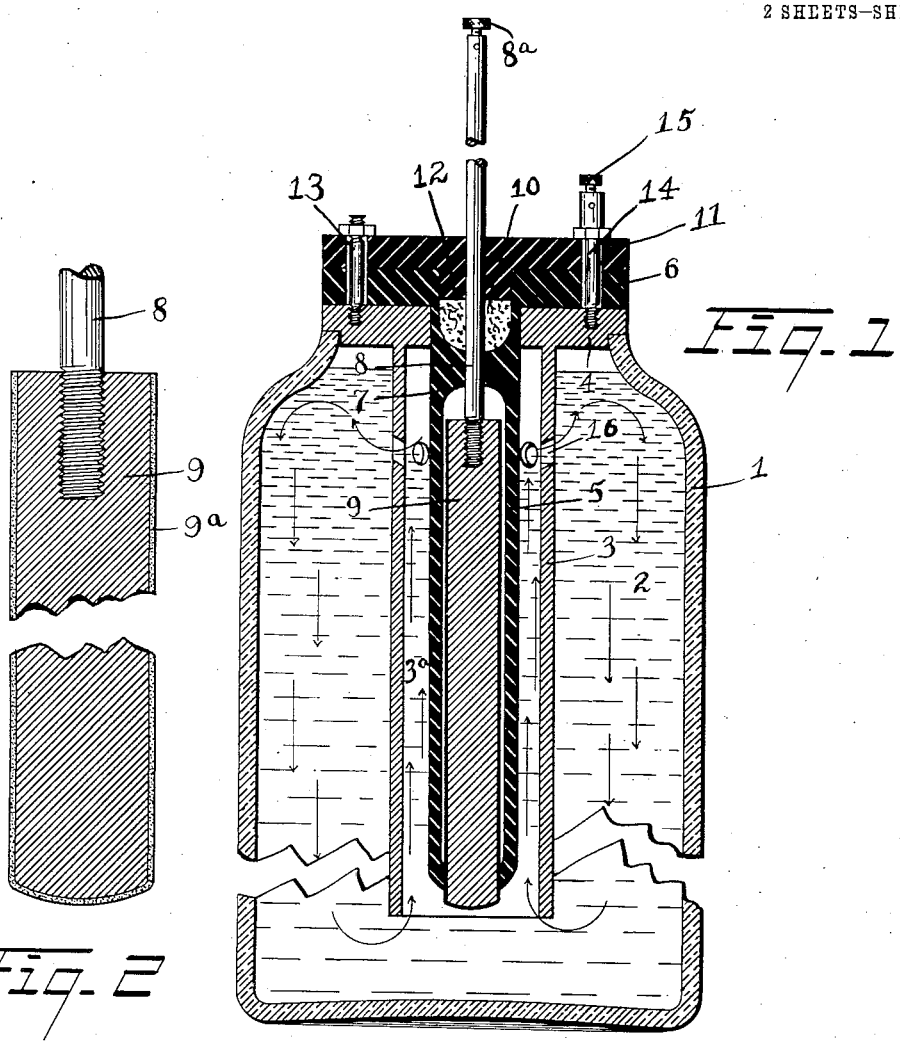
Fig. 1
Fig. 2
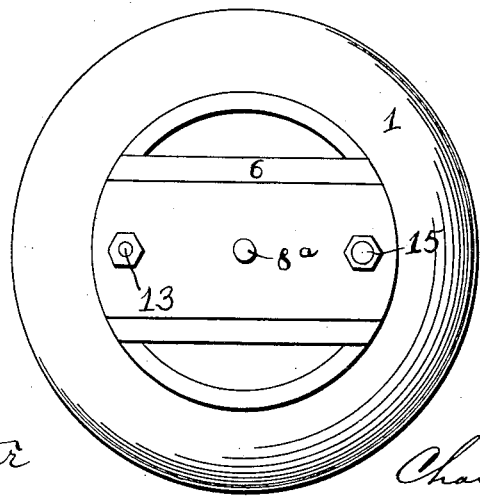
Fig. 3

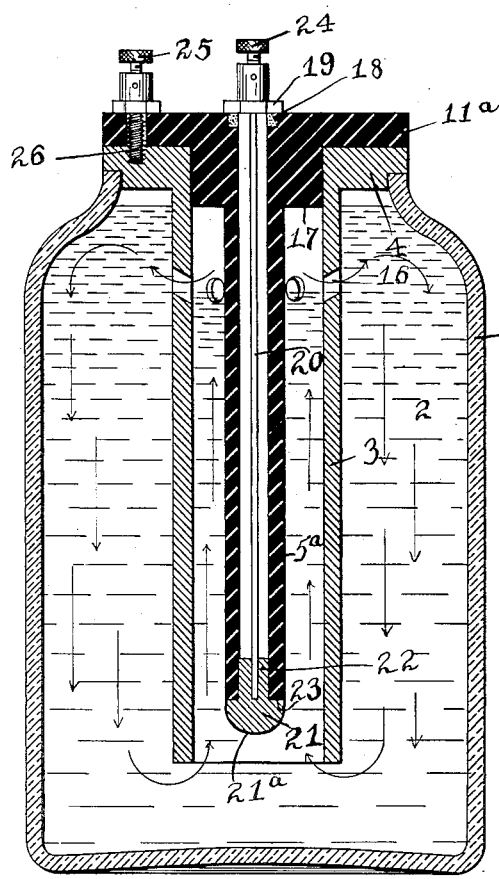
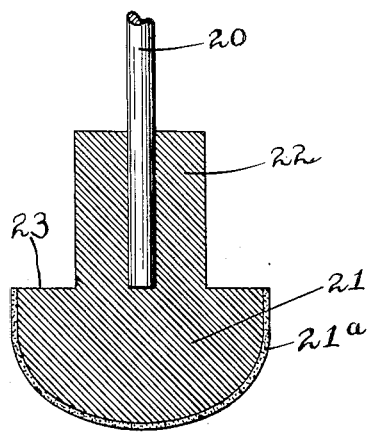

CHARLES C. RUPRECHT, OF CLEVELAND, OHIO.

METHOD OF AND APPARATUS FOR RECTIFYING ELECTRIC CURRENTS.

1,121,764.     Specification of Letters Patent.     Patented Dec. 22, 1914.

Application filed February 6, 1908. Serial No. 414,558.

*To all whom it may concern:*

Be it known that I, CHARLES C. RUPRECHT, a citizen of the United States, residing at Cleveland, in the county of Cuyahoga and State of Ohio, have invented a certain new and useful Improvement in Methods of and Apparatus for Rectifying Electric Currents, of which the following is a full, clear, and exact description, reference being had to the accompanying drawings.

This invention relates to the rectification of electric currents and has for its object the provision of a method whereby the capacity of apparatus for this purpose may be greatly increased and at the same time prevent the polarization and overheating of the electrolyte (where a liquid electrolyte is employed) as well as of the electrodes, also the production of an apparatus whereby the method may be cheaply and efficiently carried out.

The apparatus, illustrated in two modifications herein, is similar in the general arrangement of parts to that shown in my prior patent granted April 15, 1913, No. 1,059,002, and comprises a jar having therein a pair of electrodes, one of said electrodes surrounding the other and being provided at its upper end with a chamber wherein, in the event that a liquid electrolyte is employed, the gases liberated by the decomposition of the electrolyte may collect and from which chamber they may be discharged below the surface of the electrolyte to produce thereby a circulation of the electrolyte and thereby maintain the apparatus and electrolyte relatively cool during the operation of rectifying as well as maintaining the electrolyte of uniform density throughout. By the apparatus disclosed herein, however, I am enabled to increase greatly the capacity of rectifiers of the type shown in my preceding application, both as to the pressure and strength of currents which may be rectified.

Generally speaking, the invention may be defined as consisting of the combinations of steps and elements embodied in the claims hereto annexed and illustrated in the accompanying drawings, wherein—

Figure 1 represents a central vertical sectional view through a rectifier constructed in accordance with my invention; Fig. 2 represents an enlarged vertical sectional view of the inner electrode; Fig. 3 represents a top plan view of the apparatus shown in Fig. 1; Fig. 4 represents a view, similar to Fig. 1, of another form of rectifier embodying my invention; and Fig. 5 represents an enlarged vertical sectional view of the inner or negative electrode shown in Fig. 4.

Describing the parts by reference characters, 1 denotes a jar having therein an electrolyte 2, which may be a liquid or a gas, the former being indicated; 3 a hollow electrode of conductive material which will not be decomposed by the action of the electrolyte. The material employed for this electrode may be iron or a composition of lead and antimony, or carbon, or any other conductive material which will withstand the action of the electrolyte. Electrode 3 may be conveniently cast or formed with the head 4, which is adapted to rest upon the top of the jar, but not completely cover the same, as will appear from Fig. 3. The head 4 is provided with a central aperture through which there projects a tube or casing 5 of insulating material, such as porcelain. Sleeve 5 is carried from a head 6 of the same or similar insulating material, said head resting upon the head 4. Sleeve 5 is provided near its upper end with a transverse web 7 having a bore therethrough for rod 8 which carries the electrode 9, and said sleeve is contracted at its lower end to form a close fit with said electrode. Above said web there is provided a cup for the reception of packing material 10, said packing material being retained in place by means of a head 11 of insulating material provided with a central projection 12, which fits the cup in the upper end of sleeve 5, thereby compressing the packing therein and thus preventing the escape of gas that may enter said sleeve. Head 11 is provided with a bore for rod 8. Heads 6 and 11 are secured to head 4 by means of bolts 13 and 14, said bolts being threaded into the head 4 and the latter bolt being provided with a stud 15 for connection with one of the electrical conductors, rod 8 being provided with a stud 8ª constituting the other terminal. Electrode 3 is provided, at a suitable distance below head 4, with an annular series of ports 16. These ports are arranged equidistant from head 4 and constitute in effect an upwardly inclined annular port through which gases liberated by electrolysis may be discharged from the chamber thereabove to cause the circulation of the electrolyte throughout the cell in the same general manner as described in my prior application. The hydrogen and oxygen liberated by the passage of the currents through the liquid electrolyte ascend into the chamber 3ª and accumulate therein. When the volume and pressure of these gases are sufficiently great, they displace the solution within electrode 3 and escape through openings 16, whence they ascend to the top of the jar. During the operation, the electrolyte will stand within the electrode 3 about half way across the openings 16, and the gases will escape through the upper unsealed portions of these openings, exercising a suction or aspiration on the electrolyte therebelow within electrode 3. The inclination of openings 16 facilitates the discharge of the gases from the chamber and improves the action of such gases in causing a circulation throughout the cell, as indicated by arrows in Fig. 1. Thus a continuous circulation of the liquid electrolyte is produced upwardly through electrode 3 and openings 16 and downwardly between said electrode and the jar, effectively removing any bubbles that may accumulate on the electrodes and maintaining the temperature and consistency of the electrolyte uniform throughout, the cooling action being greatly enhanced by the heat-absorbing qualities of the hydrogen.

The inner electrode is of conducting material which may or may not be acted upon by the electrolyte, as will appear hereinafter. For this purpose, I may employ aluminum, tantalum, tungsten, platinum, carbon, or other materials. The electrolyte which will be used will be a fluid conductor for the current. As an electrolyte, I may employ a solution of sodium phosphate, ammonium phosphate, sodium carbonate, sodium biborate, or other suitable solution. The electrode 9 is provided with an outer surface, preferably a coating of non-conducting porous or permeable material, which is insoluble in the liquid electrolyte. This surface or coating may be formed by the action of the electrolyte itself directly on the electrode 9 or by other chemical action, or may be formed by electrolytic deposition on the exterior of said electrode, or it may be a coating mechanically applied thereto. In any event, it should be insoluble in the liquid electrolyte and practically inert to the gaseous electrolyte and should be porous. In Fig. 2, I have indicated this exterior surface at 9ª, such surface being represented as a coating. The purpose of this porous surface is two-fold:—first, to restrict the exposed area of the electrode, and second (and primarily) to form pores for the occlusion or retention of some of the gases produced by the electrolytic action. These gases, owing to the limited area of the pathway afforded for the electric current between the electrodes, are heated by such current in some instances to incandescence. This heating of the gases causes them to conduct the current in one direction more than another and thereby convert an alternating current into a uni-directional current. As will appear from Fig. 1, the electrode 9 is adjustable longitudinally of the sleeve 5, being retained in adjusted position by the friction of the packing against rod 8. By so adjusting the electrode 9, more or less of its surface will be exposed to the action of the electrolyte and the current. In working with currents of small amperage, but a small area of electrode 9 will be exposed. I have found that by employing a porous outer surface, such as described, every half square inch area of exposed surface of electrode 9 will efficiently rectify a current of two-and-one-half amperes or more and that, with a comparatively small apparatus, I can efficiently rectify currents as high as 50 amperes strength. Furthermore, for variations in the pressure or voltage of the currents to be rectified, the thickness of the porous surface or coating should be proportionately increased or diminished, the greater the pressure or voltage of current, the thicker the porous coating or surface. For currents of ordinary voltage (110–220 volts) the porous coating or surface will be extremely thin, even less than 1/10,000 of an inch.

In Figs. 4 and 5, there is shown another form of my invention which differs from that disclosed in the preceding figures in that the inner electrode is not adjustable, whereby, although realizing some of the objects of my invention, it will not be capable of adjustment proportionately to the strength of the current rectified. In these figures, 1 denotes the jar, 2 the electrolyte (which is indicated as a liquid) 3 the outer electrode having a head 4 adapted to rest on the jar; and 5ª the sleeve of insulating material having a head 11ª adapted to rest directly on top of head 4. The head 11ª is provided with a downwardly projecting portion 17 adapted to fit within the upper end of electrode 3 and said head 11ª and extension 17 are provided with a central bore forming a continuation of the bore of sleeve 5ª. Surrounding the bore at the upper end of the head there is provided an annular recess having therein packing 18 on which there rests a nut 19. This nut is threaded onto the stem 20 which has its lower end secured to electrode 21. Electrode 21 is provided with an upwardly extending portion 22 which fits within the bore of sleeve 5ª, being provided below such extension with a shoulder 23, which is adapted to fit against the lower end of sleeve 5ª. The lower end of electrode 21 is preferably rounded, as shown, and of a maximum diameter substantially equal to the exterior diameter of sleeve 5ª. By adjusting the nut 19, the packing 18 may be compressed so as to prevent the escape of any gas that may enter the sleeve 5ª. Electrode 3 is provided with openings 16 similar in arrangement and construction with the correspondingly-numbered openings in Fig. 1. The upper end of rod 20 is electrically connected with stud 24 for one of the conductor wires, the other wire being connected by means of stud 25 and bolt 26 with electrode 3. Electrode 21 is provided with an outer surface or coating 21ª, similar to that with which electrode 9 is provided, and serving the same purpose.

Both forms of apparatus illustrated herein are well adapted for carrying out my method of rectification which consists, broadly stated, in interposing in the path of the current to be rectified, a gaseous conductor which is adapted to be heated by the current and thereby become conductive in one direction more than another to produce a uni-directional current; also in restricting the exposed area of an electrode having a surface or coating of permeable non-conducting material, whereby gases are occluded, and are heated by the current to be rectified, thereby causing them to conduct the current in one direction more than in the other.

Having thus described my invention, I claim:

1. In a rectifying apparatus, the combination of a cell having an electrolyte therein and comprising a pair of electrodes, one of said electrodes being covered with a substantially uniform layer of porous non-conducting material thereon, and means whereby the area of such surface exposed to the action of the current may be varied, substantially as specified.

2. In a rectifying apparatus, the combination of a cell having an electrolyte and a pair of electrodes, a sleeve of non-conducting material projecting downwardly into the cell and surrounding one of said electrodes and terminating short of the end of said electrode, the upper end of said sleeve having a gas-tight closure, means whereby relative longitudinal movement between the electrode and the sleeve may be permitted, and a coating of non-conducting porous material on said electrode.

3. In a rectifying apparatus, the combination of a cell having an electrolyte and a pair of electrodes, a sleeve of rigid non-conducting material projecting downwardly within the cell and surrounding one of said electrodes, an operating rod connected with said electrode, packing surrounding said rod, and a coating of non-conducting porous material on said electrode.

4. In a rectifying apparatus, the combination of a cell comprising an electrolyte and a pair of electrodes, one of said electrodes being hollow and carried by a head, a second head resting on the former head and having a depending sleeve for the reception of the inner electrode, said sleeve being provided with a web adjacent to the upper end thereof with a bore therethrough, a rod extending through said web and connected with the inner electrode, packing material in said sleeve above said web, and a third head having a depending portion adapted to engage said packing and provided with a bore for said rod.

In testimony whereof, I hereunto affix my signature in the presence of two witnesses.

CHARLES C. RUPRECHT.

Witnesses:
  G. A. MYERS,
  J. B. HULL.